(12) United States Patent
Chang et al.

(10) Patent No.: US 10,636,534 B2
(45) Date of Patent: Apr. 28, 2020

(54) SHIELDING MATERIAL FOR SHIELDING RADIOACTIVE RAY AND PREPARATION METHOD THEREOF

(71) Applicant: NEUBORON MEDTECH LTD., Nanjing, Jiangsu (CN)

(72) Inventors: Ming-Chuan Chang, Jiangsu (CN); Wei-Lin Chen, Jiangsu (CN); Yuan-Hao Liu, Jiangsu (CN)

(73) Assignee: NEUBORON MEDTECH LTD., Nanjing Jiangsu (CN)

( * ) Notice: Subject to any disclaimer, the term of this patent is extended or adjusted under 35 U.S.C. 154(b) by 60 days.

(21) Appl. No.: 15/826,998

(22) Filed: Nov. 30, 2017

(65) Prior Publication Data
US 2018/0114605 A1    Apr. 26, 2018

Related U.S. Application Data (63) Continuation of application No. PCT/CN2016/086223, filed on Jun. 17, 2016.

(30) Foreign Application Priority Data

Jun. 19, 2015  (CN) .......................... 2015 1 0347099

(51) Int. Cl.
*G21F 1/04* (2006.01)
*C04B 14/22* (2006.01)
(Continued)

(52) U.S. Cl.
CPC .............. *G21F 1/047* (2013.01); *C04B 14/22* (2013.01); *C04B 14/368* (2013.01); *C04B 24/04* (2013.01);
(Continued)

(58) Field of Classification Search
CPC ....... G21F 1/047; G21F 1/042; C04B 14/368; C04B 24/04; C04B 28/04; C04B 28/02;
(Continued)

(56) References Cited

U.S. PATENT DOCUMENTS 6,057,257 A * 5/2000 Morano .............. C03B 19/1045
106/DIG. 1
2008/0072800 A1* 3/2008 Hughes ................... C04B 28/02
106/816

FOREIGN PATENT DOCUMENTS

CN       102442809 A      5/2012
CN       103373841 A     10/2013
(Continued)

OTHER PUBLICATIONS

English translation of CN104529297 (Year: 2015).*
International Search Report of PCT/CN2016/086223, dated Sep. 20, 2016.

*Primary Examiner* — Andrew J. Oyer
(74) *Attorney, Agent, or Firm* — Locke Lord LLP; Tim Tingkang Xia, Esq.

(57) ABSTRACT

A shielding material for shielding radioactive ray and preparation method thereof. The shielding material consists of water, a cementing material, a fine aggregate material, a coarse aggregate material and an additive, wherein the fine aggregate material consists of a borosilicate glass powder and a barite sand, and the coarse aggregate material consists of a barite. A content of boron element in the borosilicate glass powder accounts for 0.5%-1% of the total weight of the shielding material. A content of barium sulfate in the barite sand and the barite accounts for 71%-75% of the total weight of the shielding material. Other contents include water, the cementing material and the additive, and a sum of contents of all components is 100% total weight of the shielding material.

6 Claims, 2 Drawing Sheets

(51) Int. Cl.
    *C04B 14/36*         (2006.01)
    *C04B 24/04*         (2006.01)
    *C04B 28/04*         (2006.01)
    *C04B 28/02*         (2006.01)
    *C04B 103/30*       (2006.01)
    *C04B 111/00*       (2006.01)

(52) U.S. Cl.
    CPC ........ *C04B 28/04* (2013.01); *C04B 2103/302* (2013.01); *C04B 2111/00862* (2013.01)

(58) Field of Classification Search
    CPC ........... C04B 14/22; C04B 2111/00862; C04B 2103/302
    See application file for complete search history.

(56) References Cited

FOREIGN PATENT DOCUMENTS

| | | | |
|---|---|---|---|
| CN | 103803901 A | | 5/2014 |
| CN | 104529297 A | * | 4/2015 |
| CN | 104529297 A | | 4/2015 |

\* cited by examiner

SHIELDING MATERIAL FOR SHIELDING RADIOACTIVE RAY AND PREPARATION METHOD THEREOF

RELATED APPLICATION INFORMATION

This application is a continuation of International Application No. PCT/CN2016/086223, filed on Jun. 17, 2016, which claims priority to Chinese Patent Application No. 201510347099.7, filed on Jun. 19, 2015, the disclosures of which are hereby incorporated by reference.

FIELD OF THE DISCLOSURE

The present disclosure relates generally to a shielding material, and, more particularly, to a shielding material for shielding radioactive ray and preparation method thereof.

BACKGROUND OF THE DISCLOSURE

The shielding material for shielding radioactive ray is a novel material which can effectively protect the human body from the radiation of harmful ray. The development and application of the shielding material for shielding radioactive ray developed with the development and application of the atomic energy industry and the nuclear technology. In recent years, the nuclear technology not only has been used in national defense construction, but also has permeated into various fields including industry, agriculture, medical treatment and the like, such as applications of nuclear electric power generation and isotopes in industry, medical assay, pharmacy and sealing of nuclear wastes. In the process of production application, how to prevent the harm of various rays generated by nuclear radiation on the human body has been an innegligible issue in the utilization of the nuclear technology.

Radioactive ray mainly include X ray, α ray, β ray, γ ray, neutron ray, proton ray and so on. Their penetrabilities are different. As α particles, β particles and protons have electric charges, when they interact with the atomic electric field of a protective substance, their energy will be decreased, and even a protective material with very small thickness can also completely block them. Therefore, concrete for shielding radioactive ray mainly shields the X ray, the γ ray and the neutron ray.

The X ray is a type of electromagnetic waves with very short wavelengths and great energy, the wavelengths (about 0.001 to 100 nanometers, the wavelengths of the X ray applied medically are approximately between 0.001 and 0.1 nanometers) of the X ray are shorter than the wavelength of visible light, and their photon energy is tens of thousands to hundreds of thousands of times greater than the photon energy of visible light. As the X ray have short wavelengths and great energy, when irradiating a substance, only part of the X ray will be absorbed by the substance, and most of the X ray will pass through via gaps between atoms, showing strong penetrability. The ability of the X ray in penetrating substances is related to the energy of X ray photons, and the shorter the wavelength of an X ray is and the greater the energy of the photons is, the stronger the penetrability is. The penetrability of the X ray is also related to substance densities, and by utilizing the property of differential absorption, substances with different densities can be differentiated.

The γ ray is a type of electromagnetic waves with high energy and high frequency, and has enormous penetrability. As they penetrate a protective substance, they can be absorbed gradually, but only when the protective substance exceeds a certain thickness can they be absorbed completely.

Neutrons are particles without electric charges in atomic nuclei, and a neutron ray is a neutron current composed of these neutrons without electric charges. According to the magnitude of energy and the velocity of motion, the neutrons are divided into slow neutrons, intermediate neutrons and fast neutrons, nuclei can only capture and absorb the slow neutrons, the rapid neutrons can only be decelerated by colliding with nuclei, but when the nuclei of certain substances collide with the neutrons, secondary γ ray will be generated. The intermediate neutrons can be decelerated by the nuclei of light elements, so that required energy is captured.

Radioactive rays generated by an atomic reactor and an accelerator are mainly the γ ray and the neutron ray. Sometimes, a small quantity of low energy X rays are generated, shielding materials for shielding radioactivity can easily shield the X rays. Therefore, the protection issues of the atomic reactor and the accelerator mainly boil down to the issue of protection against the γ ray and the neutron ray.

With regard to the γ ray, the higher the density of a substance is, the better the shielding property is. Almost all materials have certain shielding capabilities again the γ ray, but when a light atomic mass material with small density is adopted, the thickness of a shielding structure is required to be great, and as a result, the area and volume of a building are increased. As the effect of materials with high atomic mass, such as lead, zinc and steel, in protecting against the γ ray is high, a shielding structure can be made thin, but these materials are expensive.

With regard to fast neutron and intermediate neutron, not only heavy elements but also sufficient light elements are needed, it is best to contain a lot of water, that is because water contains the lightest element, hydrogen, and in this aspect, water has an excellent shielding effect; and with regard to slow neutron, it has to be considered to contain a material for absorbing or shielding the slow neutrons.

Ordinary concrete is a cheap and satisfactory shielding material for shielding radioactive ray, but it is low in density and the content of the bound water. Therefore, thickness needs to be increased when an ordinary concrete structure is adopted.

For radiation-shielding concrete, not only are high volumetric weight and high bound water content required, but also the concrete is required to have good homogeneity. The shrinkage of concrete structures should be minimum during construction and use, and defects, such as cavities and cracks, are not allowed to exist. Besides, the concrete is also required to have certain structural strength and fire resistance.

Therefore, for the defects of the prior art, it is necessary to propose a shielding material for shielding radioactive ray that is composed of light elements and heavy elements properly and has good mechanical properties, waterproofness and constructability. The material containing the light and heavy elements can be layered, or can be a uniform mixture.

SUMMARY

In order to overcome the defects of the prior arts, an aspect of the present disclosure provides a shielding material for shielding radioactive ray. The shielding material is composed of water, a cementing material, fine aggregate, coarse aggregate and an additive, wherein the fine aggregate is composed of borosilicate glass powder and barite sand, and the coarse aggregate is composed of a barite; boron element content in the borosilicate glass powder accounts for 0.5 to 1 percent of the total weight of the shielding material; barium sulfate content in the barite sand and the barite accounts for 71 to 75 percent of the total weight of the shielding material; the other contents are the water, the cementing material and the additive, and a sum of contents of all the components is 100 percent total weight of the shielding material.

Implementations of this aspect may include one or more of the following features.

More particularly, the cementing material is P.II 52.5 Portland cement, the additive is one or more of a water reducer, an early strength agent, a retarder, a pumping agent and an expanding agent.

Further, a range of density of the shielding material is 3.46 g/cm$^3$ to 3.55 g/cm$^3$.

Further, a polycarboxylic water reducer is chosen as the additive.

The shielding material in the present embodiment is applicable to radioactive sources for neutron capture therapy that contain neutron and Gamma ray.

In another aspect of the present disclosure, a preparation method for a shielding material for shielding radioactive ray is provided. Wherein the preparation method includes the following steps:

crushing and screening a barite ore, so that the barite sand for fine aggregate, the grain size of which is less than 4.75 mm but not less than 75 μm, is obtained;

crushing and screening a barite ore, so that the barite for coarse aggregate, the grain size of which is not less than 4.75 mm, is obtained;

crushing and screening a borosilicate glass, so that the borosilicate glass powder for the fine aggregate, the grain size of which is less than 4.75 mm but not less than 75 μm, is obtained;

pouring the cement, the coarse aggregate and the fine aggregate into a container to form a partially mixed material;

pouring the water and the additive into the container;

premixing along with the partially mixed material for a preset time t, wherein 30 s≤t≤60 s; and mixing the partially mixed material by a mixer and then discharging.

The beneficial effects of the embodiments of the present disclosure are as follows:

1. good performance in shielding neutron and Gamma ray (photons);
2. low cost;
3. compatible thickness.

Further areas of applicability will become apparent from the description provided herein. It should be understood that the description and specific examples are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

In accordance with specific embodiments, a shielding material for shielding radioactive ray in the present disclosure will be further elaborated hereinafter, so that its composition and effect can be understood more clearly, but the protection scope of the present invention should not be limited thereby.

Figure 1:
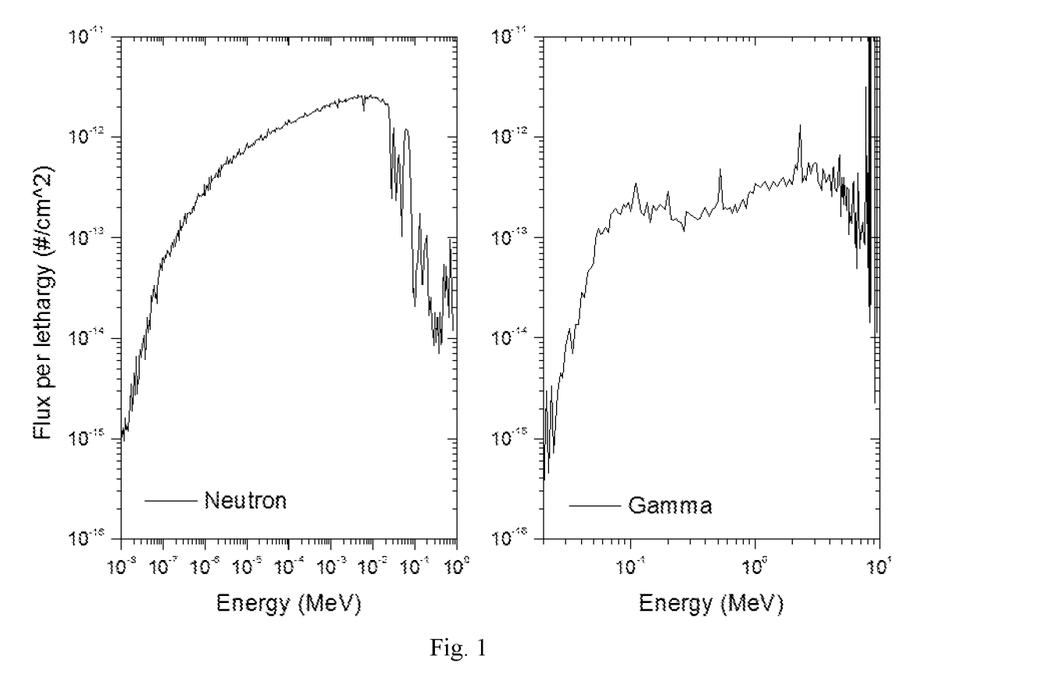
FIG. 1 is energy spectra of neutron and Gamma ray in a radioactive source coming out of a beam outlet for neutron capture therapy used in embodiments of the present disclosure.

The following embodiments adopt a radioactive source for neutron capture therapy that contains neutron and Gamma ray, and thus, the neutron and Gamma ray shielding effect of the following embodiments of the shielding material for shielding radioactive ray in the present disclosure can be highlighted. For details, please refer to FIG. 1. It shows energy spectra of neutron and Gamma ray in a radioactive source coming out of a beam outlet for neutron capture therapy. Taking the intensity of the neutron and Gamma ray 4.5 meters away from the beam outlet into consideration, most of neutrons fall into an epithermal neutron energy region (0.5 eV-10 eV), while the energy of the Gamma ray is distributed uniformly in a range from 0.1 MeV to 10 MeV. The embodiments of the present disclosure only take this radioactive source as an example, but do not limit the variety of radioactive sources thereby. As wellknown by those skilled in the art, according to the teaching and suggestion of the embodiments of the present disclosure, the shielding material for shielding radioactive ray in the embodiments of the present disclosure is also applicable to other radioactive sources with different energy spectra that contain neutron and Gamma ray.

The shielding material in the following embodiments is composed of water, a cementing material, fine aggregate, coarse aggregate and an additive, wherein the fine aggregate is composed of borosilicate glass powder and barite sand, and the coarse aggregate is composed of galena and barite; boron element content in the borosilicate glass powder accounts for 0.5 to 1 percent of the total weight of the shielding material; barium sulfate content in the barite sand and the barite accounts for 71 to 75 percent of the total weight of the shielding material; the other contents are the water, the cementing material and the additive, and a sum of contents of all the components is 100 percent total weight of the shielding material.

The cementing material chosen for the shielding material is P.II 52.5 Portland cement, the additive is one or more of a water reducer, an early strength agent, a retarder, a pumping agent and an expanding agent, the density of a first type of shielding material is 3.46 g/cm$^3$ to 3.55 g/cm$^3$, and the density of a second type of shielding material is 3.73 g/cm$^3$ to 4.01 g/cm$^3$. As wellknown by those skilled in the art, other types of cementing materials can also be chosen for implementation; the additive can be determined according to the specific embodiments, and as a preference, a polycarboxylic water reducer is chosen as the additive in the embodiments. The embodiments will be described in detail hereinafter.

Embodiment 1

Please refer to table 1. The shielding material is composed of water, a cementing material, fine aggregate, coarse aggregate and an additive. The weight of the water accounts for 2.48 percent of the total weight of the shielding material, P.II 52.5 Portland cement is chosen as the cementing material, the fine aggregate is composed of borosilicate glass powder and barite sand, and the coarse aggregate is composed of barite, a polycarboxylic water reducer is chosen as the additive, wherein the weight of boron element accounts for 0.51 percent of the total weight of the shielding material, the content of barium sulfate accounts for 75.33 percent of the total weight of the shielding material, the other contents are the cementing material and the additive, and a sum of contents of all the components is 100 percent total weight of the shielding material.

A preparation process mainly includes the following steps: (1) crushing and screening a barite ore, so that the barite sand for the fine aggregate, the grain size of which is less than 4.75 mm but not less than 75 μm, is obtained; (2) crushing and screening a barite ore, so that the barite for the coarse aggregate, the grain size of which is not less than 4.75 mm, is obtained; (3) crushing and screening a borosilicate glass, so that the borosilicate glass powder for the fine aggregate, the grain size of which is less than 4.75 mm but not less than 75 μm, is obtained; (4) pouring the cement, the coarse aggregate and the fine aggregate into a container to form a partially mixed material; (5) pouring the the water and the additive into the container and premixing along with the partially mixed material for a preset time t, wherein $30 \leq t \leq 60$ s; and (6) mixing the partially mixed material by a mixer and then discharging.

In some cases requiring outside transportation, two types of transportation means, a mixer truck and a tipper truck, can be chosen to be adopted, but the range of application should be taken into consideration. It is crucial that the shielding material should be transported and poured almost in a state at the completion of mixing as much as possible. Transportation must be quick, and the time from the beginning of mixing to arrival at a site should be controlled. According to the provisions of the current national standard Standard for Quality Control of Concrete GB 50164, when outside air temperature is lower than 25° C., the mixer truck is adopted for transportation, and the transportation time should not be longer than 90 minutes for concrete greater than or equal to C30; and when outside air temperature exceeds 25° C., the transportation time should not be longer than 60 minutes for the concrete greater than or equal to C30. According to the provisions of the current national standard Premixed Concrete GB/T 14902, concrete which is transported by adopting the mixer truck should be unloaded within 1.5 hours; concrete which is transported by adopting the tipper truck should be unloaded within 1.0 hours; and when the highest air temperature is lower than 25° C., the transportation time can be prolonged by 0.5 hour. The reason why 90 minutes is specified is that the longer the time is, the slump loss of concrete will be greater, and as a result, the workability of the concrete cannot be guaranteed. During practical application, when properties cannot meet requirements, an additive can be added for regulation on the basis of experimental verification, and water is not allowed to be added. Normally, technical measures, such as adding an additive with a retarding effect to prolong the solidification time of concrete, are adopted.

The strength grade of the shielding material is C30 or C40, the standard axial compressive strength value of the shielding material should reach 17.1 N/mm² to 22.8 N/mm² or be higher, and the standard axial tensile strength value of the shielding material should reach 1.70 N/mm² to 2.05 N/mm² or be higher.

P.II 52.5 Portland cement is chosen as the variety of the cement, that is, the contents of clinker and gypsum is greater than or equal to 95 percent of the total weight of the cement, the content of granulated blast-furnace slag is less than or equal to 5 percent of the total weight of the cement, or the content of limestone is less than or equal to 5 percent of the total weight of the cement. The clinker mainly contains raw materials of CaO, $SiO_2$, $Al_2O_3$ and $Fe_2O_3$, which are ground into fine powder according to appropriate proportions and are burnt to be fused partially, so that a hydraulic cementing substance with calcium silicate as a main mineral component is obtained. The calcium silicate mineral is not less than 66 percent, and the mass ratio of calcium oxide to silicon oxide is not less than 2.0. With regard to the choice of gypsum, if natural gypsum is chosen, it should be gypsum or mixed gypsum that is grade II or above in category G or category M, as specified in GB/T 5483; if gypsum which is an industrial byproduct is chosen, it should be an industrial byproduct with calcium sulfate as a main component, and before adoption, an experiment should be carried out to prove that cement properties are not impaired. Among the chemical indexes of the P.II 52.5 Portland cement, insoluble substances (parts by mass) should be less than or equal to 1.50 percent, loss on ignition (parts by mass) should be less than or equal to 3.5 percent, sulfur trioxide (parts by mass) should be less than or equal to 3.5 percent, magnesium oxide (parts by mass) should be less than or equal to 6.0 percent, and chloridion (parts by mass) should be less than or equal to 0.06 percent. The grade of the Portland cement is 52.5; 3 days after shaping, the compressive strength is greater than or equal to 23.0 Mpa, and the bending strength is greater than or equal to 4.0 MPa; 28 days after shaping, the compressive strength is greater than or equal to 52.5 Mpa, and the bending strength is greater than or equal to 7.0 MPa.

In the shielding material prepared according to the proportions and the preparation method, the borosilicate glass powder accounts for 17 percent of the weight of the fine aggregate, and the barite sand accounts for 83 percent of the weight of the fine aggregate. The volumetric weight (i.e., density) of the shielding material is 3554 kg/m³, and the sand ratio is 32.1 percent. The water-cement ratio is 0.37, and the amount of the added additive is 1.80 percent. Calculated according to a total amount of 500 tons in demand, the weights of the various needed substances are listed in table 1 below.

TABLE 1

Weight Proportions in Embodiment 1

| | | | \multicolumn{8}{c}{Composition} | | |
|---|---|---|---|---|---|---|---|---|---|---|---|
| | | | Water | Cement | Fine Aggregate | | | Coarse Aggregate | | Additive | (Unit: kg/m³) |
| \multicolumn{3}{l}{Apparent Density (g/cm³)} | 1.00 | 3.12 | 2.23 | 4.34 | 3.98 | 4.34 | 4.34 | 1.20 | |
| Strength Grade | Cement Variety | Additive Variety | Water | Cement | Borosilicate glass powder | Barite sand | Total | Barite | Total | Additive | Volumetric weight | Sand ratio |
| C30 or C40 | P.II 52.5 | Poly-carboxylic water reducer | 142 | 400 | 164 | 802 | 966 | 2046 | 2046 | 7.20 | 3554 | 32.1% |
| Mass Ratio | | | | | 17% | 83% | 100% | 100% | 100% | | | |
| Volumes (L) | | | 141.7 | 128 | 73.5 | 184.8 | 242.7 | 471.4 | 471.4 | 6.0 | Substances H₂O | Contents 2.48% |
| Total Amount | Water | Water-cement Ratio | Additive | Volume Sand Ratio | Total Amount in Demand | Borosilicate glass powder | Barite sand | Barite | Cement | Additive | B | 0.51% |
| B 400 | W 148 | W/B % 0.37 | AD % 1.80% | s/a % 34% | 500 tons | 20.5 | 100.3 | 255.8 | 50 | 9.0 | BaSO₄ | 75.33% |

For the same materials, conditions or method used in embodiment 1, please refer to the description in embodiment 1, which will not be repeated in embodiments 2-3.

Embodiment 2

Please refer to table 2. The shielding material is composed of water, a cementing material, fine aggregate, coarse aggregate and an additive. The weight of the water accounts for 2.51 percent of the total weight of the shielding material, P.II 52.5 Portland cement is chosen as the cementing material, the fine aggregate is composed of borosilicate glass powder and barite sand, the coarse aggregate is composed of barite, and a polycarboxylic water reducer is chosen as the additive, wherein the weight of boron accounts for 0.75 percent of the total weight of the shielding material, the content of barium sulfate accounts for 73.07 percent of the total weight of the shielding material, the other contents are the cementing material and the additive, and a sum of contents of all the components is 100 percent total weight of the shielding material.

Its preparation method is the same as that of embodiment 1. In the shielding material produced according to the proportions and the preparation method, the borosilicate glass powder accounts for 26 percent of the weight of the fine aggregate, and the barite sand accounts for 74 percent of the weight of the fine aggregate. The volumetric weight (i.e., density) of the shielding material is 3508 kg/m³, and the sand ratio is 31.0 percent. The water-cement ratio is 0.37, and the amount of the added additive is 1.80 percent. Calculated according to a total amount of 500 tons in demand, the weights of the various needed substances are listed in table 2 below.

TABLE 2

Weight Proportions in Embodiment 2

| | | | \multicolumn{8}{c}{Composition} | | |
|---|---|---|---|---|---|---|---|---|---|---|---|
| | | | Water | Cement | Fine Aggregate | | | Coarse Aggregate | | Additive | (Unit: kg/m³) |
| \multicolumn{3}{l}{Apparent Density (g/cm³)} | 1.00 | 3.12 | 2.23 | 4.34 | 3.79 | 4.34 | 4.34 | 1.20 | |
| Strength Grade | Cement Variety | Additive Variety | Water | Cement | Borosilicate glass powder | Barite sand | Total | Barite | Total | Additive | Volumetric weight | Sand ratio |
| C30 or C40 | P.II 52.5 | Poly-carboxylic water reducer | 142 | 400 | 239 | 681 | 921 | 2046 | 2046 | 7.20 | 3508 | 32.0% |
| Mass Ratio | | | | | 26% | 74% | 100% | 100% | 100% | | | |
| Volumes (L) | | | 141.7 | 128 | 107.3 | 157.0 | 243.0 | 471.4 | 471.4 | 6.0 | Substances H₂O | Contents 2.51% |

TABLE 2-continued

| | | | | | | Weight Proportions in Embodiment 2 | | | | | | | |
|---|---|---|---|---|---|---|---|---|---|---|---|---|---|
| Total Amount | Water | Water-cement Ratio | Additive | Volume Sand Ratio | Total Amount in Demand | Borosilicate glass powder | Barite sand | Barite | Cement | Additive | B | | 0.75% |
| B 400 | W 148 | W/B % 0.37 | AD % 1.80% | s/a % 34% | 500 tons | 29.9 | 85.2 | 255.8 | 50 | 9.0 | BaSO$_4$ | | 73.07% |

Embodiment 3

Please refer to table 3. The shielding material is composed of water, a cementing material, fine aggregate, coarse aggregate and an additive. The weight of the water accounts for 2.55 percent of the total weight of the shielding material, P.II 52.5 Portland cement is chosen as the cementing material, the fine aggregate is composed of borosilicate glass powder and barite sand, and the coarse aggregate is composed of barite, and a polycarboxylic water reducer is chosen as the additive, wherein the weight of boron element accounts for 1.00 percent of the total weight of the shielding material, the content of barium sulfate accounts for 70.76 percent of the total weight of the shielding material, the other contents are the cementing material and the additive, and a sum of contents of all the components is 100 percent total weight of the shielding material.

Its preparation method is the same as that of embodiment 1. In the shielding material prepared according to the proportions and the preparation method, the borosilicate glass powder accounts for 36 percent of the weight of the fine aggregate, and the barite sand accounts for 64 percent of the weight of the fine aggregate. The volumetric weight (i.e., density) of the shielding material is 3457 kg/m$^3$, and the sand ratio is 29.8 percent. The water-cement ratio is 0.37, and the amount of the added additive is 1.80 percent. Calculated according to a total amount of 500 tons in demand, the weights of the various needed substances are listed in table 3 below.

TABLE 3

| | | | | | | Weight Proportions in Embodiment 3 | | | | | | | |
|---|---|---|---|---|---|---|---|---|---|---|---|---|---|
| | | | | | | Composition | | | | | | | |
| | | | Water | Cement | Fine Aggregate | | | Coarse Aggregate | | Additive | (Unit: kg/m$^3$) | | |
| Apparent Density (g/cm$^3$) | | | 1.00 | 3.12 | 2.23 | 4.34 | 3.58 | 4.34 | 4.34 | 1.20 | | | |
| Strength Grade | Cement Variety | Additive Variety | Water | Cement | Borosilicate glass powder | Barite sand | Total | Barite | Total | Additive | Volumetric weight | Sand ratio | |
| C30 or C40 | P.II 52.5 | Polycarboxylic water reducer | 142 | 400 | 313 | 556 | 869 | 2046 | 2046 | 7.20 | 3457 | 29.8% | |
| Mass Ratio | | | | | 36% | 64% | 100% | 100% | 100% | | | | |
| Volumes (L) | | | 141.7 | 128 | 140.3 | 128.2 | 242.8 | 471.3 | 471.3 | 6.0 | Substances H$_2$O | Contents 2.55% | |
| Total Amount | Water | Water-cement Ratio | Additive | Volume Sand Ratio | Total Amount in Demand | Borosilicate glass powder | Barite sand | Barite | Cement | Additive | B | | 1.00% |
| B 400 | W 148 | W/B % 0.37 | AD % 1.80% | s/a % 34% | 500 tons | 39.1 | 69.5 | 255.7 | 50 | 9.0 | BaSO$_4$ | | 70.76% |

Two shielding materials for shielding radioactive ray which are common in the market are introduced hereinafter to be compared with the shielding material for shielding radioactive ray in the embodiments of the present disclosure.

Comparative Example 1

Comparative example 1 is a radiation-shielding material which is common in the market, and the percentages by weight of elements contained in it are listed in table 4 below:

TABLE 4

Elements and Contents thereof in Comparative Example 1

| | H | B | O | Al | Si | S | Fe | Ca | Ba | Na | Pb | Mg | C | K |
|---|---|---|---|---|---|---|---|---|---|---|---|---|---|---|
| Contents | 0.8% | — | 47.3% | 3.6% | 14.5% | 0.3% | 1.1% | 24.7% | — | — | — | 2.4% | 5.0% | 0.2% |

Comparative Example 2

Comparative example 2 is another barite radiation-shielding material, and its weight proportions are listed in table 5 below:

TABLE 5

Substances and Weight Proportions thereof in Comparative Example 2

| | | | | Composition | | | | | | | |
|---|---|---|---|---|---|---|---|---|---|---|---|
| | | | Water | Cement | Fine Aggregate | | Coarse Aggregate | | Additive | (Unit: kg/m$^3$) | |
| Apparent Density (g/cm$^3$) | | | 1.00 | 3.12 | 2.23 | 4.34 | 4.34 | 4.34 | 1.20 | | |
| Strength Grade | Cement Variety | Additive Variety | Water | Cement | Borosilicate glass powder | Barite sand | Total | Barite | Total | Additive | Volumetric weight | Sand ratio |
| C30 or C40 | P.II 52.5 | Polycarboxylic water reducer | 142 | 400 | 0 | 1054 | 1054 | 2046 | 2046 | 7.20 | 3641 | 34.0% |
| Mass Ratio | | | | | 0% | 100% | 100% | 100% | 100% | | | |
| Volumes (L) | | | 141.7 | 128 | 0.0 | 242.8 | 242.8 | 471.3 | 471.3 | 6.0 | Substances H$_2$O | Contents 2.42% |
| Total Amount | Water | Water-cement Ratio | Additive | Volume Sand Ratio | | | | | | | B | 0.00% |
| B 400 | W 148 | W/B % 0.37 | AD % 1.80% | s/a % 34% | | | | | | | BaSO$_4$ | 80.02% |

For the elements contained in the shielding material in each of the above-mentioned embodiments and comparative examples and the percentage of each element accounting for the total weight of the shielding material, please refer to table 6 below:

TABLE 6

Elements and Contents thereof in Embodiments and Comparative Examples

| | Comparative Example 1 | Comparative Example 2 | Embodiment 1 | Embodiment 2 | Embodiment 3 |
|---|---|---|---|---|---|
| H | 0.8% | 0.3% | 0.3% | 0.3% | 0.3% |
| B | — | — | 0.5% | 0.8% | 1.0% |
| O | 47.3% | 29.6% | 31.0% | 32.1% | 32.3% |
| Al | 3.6% | 0.4% | 0.4% | 0.4% | 0.4% |
| Si | 14.5% | 1.1% | 2.4% | 3.2% | 3.7% |

TABLE 6-continued

Elements and Contents thereof in Embodiments and Comparative Examples

| | Comparative Example 1 | Comparative Example 2 | Embodiment 1 | Embodiment 2 | Embodiment 3 |
|---|---|---|---|---|---|
| S | 0.3% | 11.8% | 11.1% | 10.8% | 10.5% |
| Fe | 1.1% | 0.3% | 0.3% | 0.3% | 0.3% |
| Ca | 24.7% | 5.0% | 5.2% | 5.2% | 5.3% |
| Ba | — | 50.1% | 47.2% | 46.6% | 44.3% |
| Na | — | — | 0.2% | 0.3% | 0.4% |
| Pb | — | — | — | — | — |
| Mg | 2.4% | — | — | — | — |
| C | 5.0% | — | — | — | — |
| K | 0.2% | — | — | — | — |
| Density (g/cm$^3$) | 2.36 | 3.64 | 3.55 | 3.51 | 3.46 |

For the radiation-shielding property indexes of the shielding material in each of the embodiments and the comparative examples, please refer to table 7, and it can be seen therefrom that under the condition of the same thickness of 50 cm, both the neutron-shielding property and photon-shielding property of the shielding materials in embodiments 1-5 are far better than those in comparative examples 1-2.

TABLE 7

Radiation-shielding Property Indexes of Embodiments and Comparative Examples

| | Thickness (cm) | Density (g/cm$^3$) | Neutron Attenuation Coefficient | Photon Attenuation Coefficient |
|---|---|---|---|---|
| Comparative Example 1 | 50 | 2.36 | 0.104 | 0.042 |
| Comparative Example 2 | 50 | 3.64 | 0.100 | 0.058 |
| Embodiment 1 | 50 | 3.55 | 0.161 | 0.084 |
| Embodiment 2 | 50 | 3.51 | 0.166 | 0.084 |
| Embodiment 3 | 50 | 3.46 | 0.175 | 0.083 |

Considering from the thickness and price factors of the shielding materials, especially the thicknesses of the various shielding materials required to attenuate the radioactive source for neutron capture therapy to an ambient dose equivalent rate of 2.5 μSv/h (as a suggestion for reference), please see table 8, although the shielding material in comparative example 1 is very cheap, the material is required to be very thick in order to achieve the requirement of the standard; although the shielding material in comparative example 2 is cheap, the required thickness is also large; and although the shielding material of boron-containing polyethylene+lead bricks can come up to the requirement of the standard with very small thickness, its price is very high. Whereas, under the precondition of meeting the standard, the shielding materials in embodiments 1-3 not only are moderate in thicknesses, but also are cheap.

TABLE 8

Thicknesses and Prices of Shielding Materials

| Shielding Materials | Thickness of Material 1 (cm) | Thickness of Material 2 (cm) | Total Thicknesses (cm) | Prices |
|---|---|---|---|---|
| Comparative Example 1 | — | — | 180 | Very cheap |
| Comparative Example 2 | — | — | 130 | Cheap |
| Example 2 Boron-containing polyethylene + lead bricks | 12 | 18 | 30 | Very high |
| Embodiment 1 | — | — | 80 | Cheap |
| Embodiment 2 | — | — | 80 | Cheap |
| Embodiment 3 | — | — | 80 | Cheap |

Please see FIG. 2 and FIG. 3 below to evaluate the effective dose performances of the various shielding materials under different thicknesses.

Figure 2:
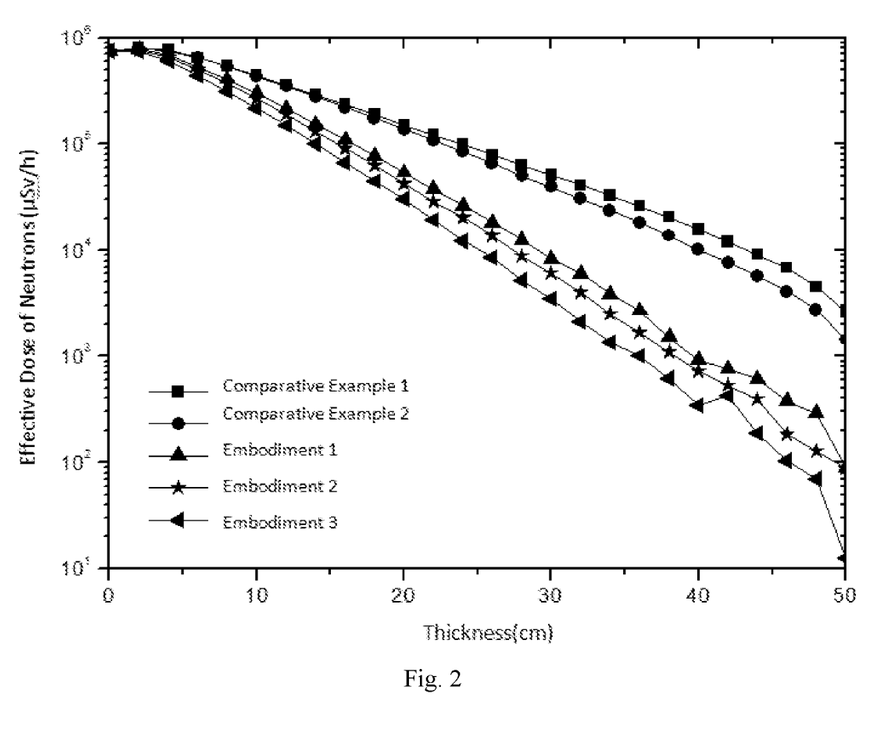
FIG. 2 is neutron shielding effects of embodiments 1 to 3 of the present disclosure and comparative examples under different thicknesses.
Figure 3:
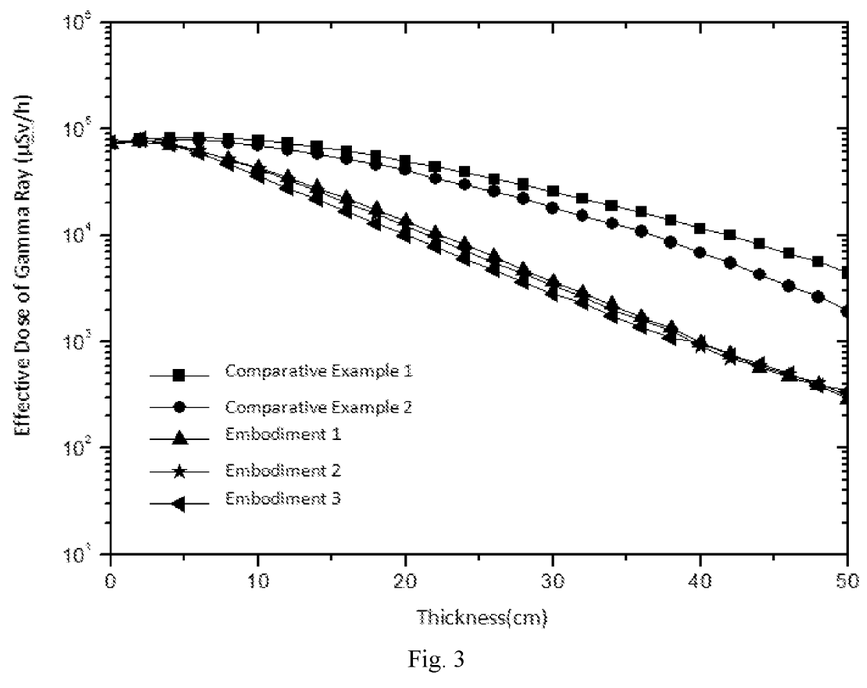
FIG. 3 is Gamma ray shielding effects of the embodiments 1 to 3 of the present disclosure and the comparative examples under the different thicknesses.

It can be seen from FIG. 2 and FIG. 3 that the shielding materials in the embodiments have obvious advantages in comparison with the comparative examples in terms of shielding both neutrons and γ, and with an increase in thicknesses, their effect will become more remarkable.

Because the capture cross section of $^{10}$B for neutrons complies with the characteristic of 1/v within a range that energy is lower than 500 keV, as neutron energy decreases, the reaction cross section increases as well, for example, there are about 3866 barns of capture cross section for neutrons of 0.025 eV, and therefore a large number of epithermal neutrons will be absorbed by the $^{10}$B element after the epithermal neutrons are decelerated into slow neutrons by the concrete. That is, 0.5 percent of boron content in embodiment 1 can exert a good neutron shielding effect, there is no obvious difference between comparative examples 1 and 2 in terms of neutron shielding, and the neutron shielding effect of the ordinary barite concrete in comparative example 2 is even poorer. This shows that for a mixed radiation field for neutron capture therapy, it is very necessary to add at least 0.5 percent of boron into concrete.

It can be seen clearly from the two comparative examples in FIG. 3 that the barite concrete has a good γ shielding effect. This is mainly because barium sulfate in barite increases the apparent density of the concrete, that is, the higher the content of barium sulfate is and the higher the apparent density is, the better the γ shielding effect is. On the basis of barite, the concrete developed by our company varies in three different types of boron contents, which highlights the necessity of adding at least 0.5 percent of boron in the concrete. Although the ordinary barite concrete in comparative example 2 is improved obviously in comparison with the ordinary concrete in comparative example 1, the effect is greatly improved after 0.5 percent of boron is added in embodiment 1.

After being mixed uniformly, the concrete is transported to a construction site by a concrete transportation truck, a property test is carried out in reference to the following method: GB/T50557-2010 Technical Code for Barite Concrete Against Radiation and GB/T50081-2002 Standard for Test Methods of Mechanical Properties of Ordinary Concrete, and a test result is shown in table 9:

TABLE 9

Property Parameters of Concrete in Each Embodiment Of the Present Disclosure

| Property Indexes | | Embodiment 1 | Embodiment 2 | Embodiment 3 |
|---|---|---|---|---|
| Slump/ | Slumps | 196 | 198 | 203 |
| Extension (mm) | Extensions | 486 | 475 | 492 |
| Compressive | 3 d | 39.8 | 40.5 | 36.6 |
| Strength (MPa) | 7 d | 48.7 | 49.6 | 44.8 |
|  | 28 d | 52.2 | 53.1 | 48.0 |
| Axial Compressive Strength (MPa) | | 36.1 | 34.9 | 37.4 |
| Compressive Elastic Modulus (GPa) | | 38.6 | 32.7 | 40.5 |

The above illustrates and describes basic principles, main features and advantages of the present disclosure. Those skilled in the art should appreciate that the above embodiments do not limit the present disclosure in any form. Technical solutions obtained by equivalent substitution or equivalent variations all fall within the scope of the present disclosure.

What is claimed is:

1. A shielding material for shielding radioactive ray consisting of:
   water;
   a cementing material;
   a fine aggregate consisting of a borosilicate glass powder and a barite sand, wherein a content of boron element in the borosilicate glass powder accounts for 0.5% to 1% of the total weight of the shielding material;
   a coarse aggregate consisting of a barite, and
   an additive selected from the group consisting of a water reducer, an early strength agent, a retarder, a pumping agent and an expanding agent, wherein a content of barium sulfate in the barite sand and the barite accounts for 71% to 75% of the total weight of the shielding material, a sum of contents of all the components is 100% total weight of the shielding material.

2. The shielding material for shielding radioactive ray according to claim 1, wherein the cementing material is P.II 52.5 Portland cement.

3. The shielding material for shielding radioactive ray according to claim 1, wherein a range of density of the shielding material is 3.46 g/cm$^3$ to 3.55 g/cm$^3$.

4. The shielding material for shielding radioactive ray according to claim 1, wherein the additive is a polycarboxylic water reducer.

5. The shielding material for shielding radioactive ray according to claim 1, wherein the shielding material is applicable to radioactive sources for neutron capture therapy that contain neutron and Gamma ray.

6. A preparation method for the shielding material for shielding radioactive ray according to claim 1, wherein the preparation method includes the following steps:
   crushing and screening a barite ore, so that the barite sand for fine aggregate, the grain size of which is less than 4.75 mm but not less than 75 μm, is obtained;
   crushing and screening a barite ore, so that the barite for coarse aggregate, the grain size of which is not less than 4.75 mm, is obtained;
   crushing and screening a borosilicate glass, so that the borosilicate glass powder for the fine aggregate, the grain size of which is less than 4.75 mm but not less than 75 μm, is obtained;
   pouring the cement, the coarse aggregate and the fine aggregate into a container to form a partially mixed material;
   pouring the water and the additive into the container;
   premixing along with the partially mixed material for a preset time t, wherein 30 s≤t≤60 s; and
   mixing the partially mixed material by a mixer and then discharging.

* * * * *